(12) United States Patent
Snyder et al.

(10) Patent No.: US 7,069,198 B2
(45) Date of Patent: Jun. 27, 2006

(54) METHOD FOR FORMULATING PAINT

(75) Inventors: Daniel Loyce Snyder, Columbia, TN (US); Walter Keith Hammock, Franklin, TN (US); Jodell Naomi Wittenberg, Clarkston, MI (US)

(73) Assignee: General Motors Corporation, Detroit, MI (US)

( * ) Notice: Subject to any disclaimer, the term of this patent is extended or adjusted under 35 U.S.C. 154(b) by 845 days.

(21) Appl. No.: 10/037,832

(22) Filed: Jan. 3, 2002

(65) Prior Publication Data

US 2003/0125911 A1    Jul. 3, 2003

(51) Int. Cl.
*G06F 17/10* (2006.01)
(52) U.S. Cl. ............... 703/2; 700/28; 700/47; 700/265; 700/266; 700/268; 703/6
(58) Field of Classification Search ............ 703/2, 703/6; 700/28, 47, 265, 266, 268
See application file for complete search history.

(56) References Cited

U.S. PATENT DOCUMENTS

| | | | | |
|---|---|---|---|---|
| 5,231,472 A | * | 7/1993 | Marcus et al. | 356/402 |
| 5,518,786 A | * | 5/1996 | Johnson et al. | 428/40.6 |
| 5,907,495 A | * | 5/1999 | Snyder et al. | 703/6 |
| 6,835,267 B1 | * | 12/2004 | Spain et al. | 156/230 |

* cited by examiner

*Primary Examiner*—Leo Picard
*Assistant Examiner*—Carlos Ortiz-Rodriguez
(74) *Attorney, Agent, or Firm*—Laura C. Hargitt

(57) ABSTRACT

A method for formulating paint is disclosed. The method includes providing a plurality of color coordinates of paints formed from a plurality of formulations and providing durability data related to the paints. Thereafter, the color coordinates, the formulations and the durability data are correlated to assist in forming paints of acceptable durability.

6 Claims, 7 Drawing Sheets

| SAMPLE | CONSTITUENTS | | | | COLOR COORDINATES | | | | | | | | | DURABILITY CHARACTERISTICS | | | |
|---|---|---|---|---|---|---|---|---|---|---|---|---|---|---|---|---|---|
| | | | | | 75° | | | 45° | | | 25° | | | ADHESION | GLOSS | FADE | DOI |
| # | $C_1$ | $C_2$ | $C_3$ | $C_n$ | $L^*$ | $a^*$ | $b^*$ | $L^*$ | $a^*$ | $b^*$ | $L^*$ | $a^*$ | $b^*$ | | | | |
| $S_1$ | | | | ... | | | | | | | | | | | | | |
| $S_2$ | | | | | | | | | | | | | | | | | |
| $S_3$ | | | | | | | | | | | | | | | | | |
| $S_4$ | | | | ... | | | | | | | | | | | | | |
| $S_X$ | | | | | | | | | | | | | | | | | |

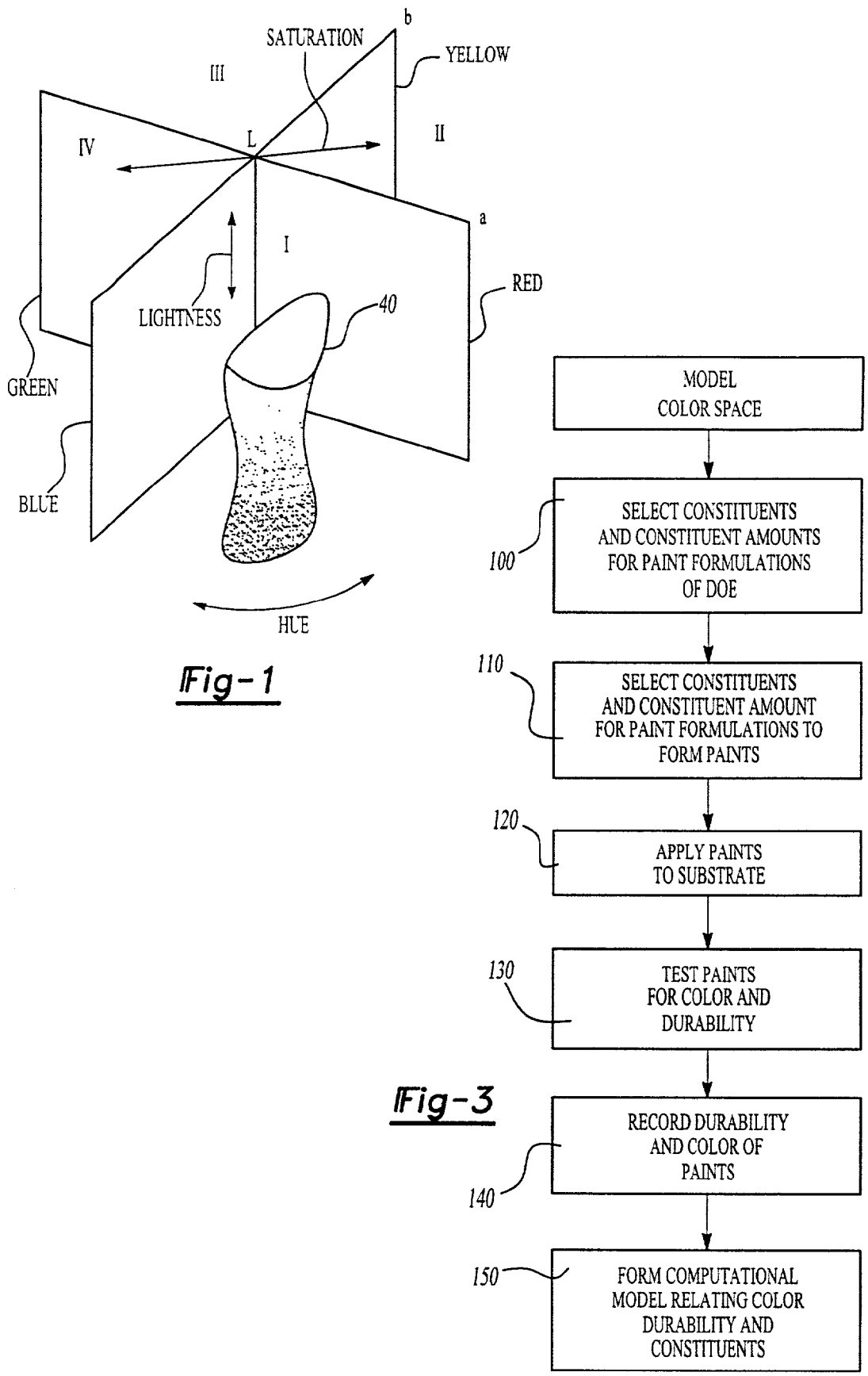

DESIGN FACTORS:

| FACTORS | FUNCTION | LEVELS |
|---|---|---|
| PERYLENE | BACKBONE OF SPACE | 5 - 60% |
| QUINDACRIDONE | BLUE TINT | 0 - 40% |
| RUSSET MICA | PEARL AND BLUE | 0 - 50% |
| ALUMINUM | LIGHTNESS/DARKNESS & HIDING | 5% (CONSTANT) |
| BLACK | LIGHTNESS / DARKNESS & HIDING | 0.5% (CONSTANT) |
| TRANS RED OXIDE | LIGHTNESS / DARKNESS | 2% (CONSTANT) |

CHART A

DESIGN LEVELS:

| RUN | PERYLENE | BLUE RUSSET MICA | QUINACRIDONE | RED IRON OXIDE | BLACK | ALUMINUM |
|---|---|---|---|---|---|---|
| 1 | 60.00 | 32.00 | 0.00 | 2.50 | 0.50 | 5.00 |
| 2 | 60.00 | 0.00 | 32.00 | 2.50 | 0.50 | 5.00 |
| 3 | 5.00 | 50.00 | 37.00 | 2.50 | 0.50 | 5.00 |
| 4 | 42.00 | 50.00 | 0.00 | 2.50 | 0.50 | 5.00 |
| 5 | 52.00 | 0.00 | 40.00 | 2.50 | 0.50 | 5.00 |
| 6 | 5.00 | 47.00 | 40.00 | 2.50 | 0.50 | 5.00 |
| 7 | 37.33 | 29.83 | 24.83 | 2.50 | 0.50 | 5.00 |
| 8 | 56.00 | 0.00 | 36.00 | 2.50 | 0.50 | 5.00 |
| 9 | 51.00 | 41.00 | 0.00 | 2.50 | 0.50 | 5.00 |
| 10 | 5.00 | 48.50 | 38.50 | 2.50 | 0.50 | 5.00 |
| 11 | 60.00 | 16.00 | 16.00 | 2.50 | 0.50 | 5.00 |
| 12 | 23.50 | 50.00 | 18.50 | 2.50 | 0.50 | 5.00 |
| 13 | 28.50 | 23.50 | 40.00 | 2.50 | 0.50 | 5.00 |
| 14 | 48.67 | 30.92 | 12.42 | 2.50 | 0.50 | 5.00 |
| 15 | 48.67 | 14.92 | 28.42 | 2.50 | 0.50 | 5.00 |
| 16 | 21.17 | 39.92 | 30.92 | 2.50 | 0.50 | 5.00 |
| 17 | 39.67 | 39.92 | 12.42 | 2.50 | 0.50 | 5.00 |
| 18 | 44.67 | 14.92 | 32.42 | 2.50 | 0.50 | 5.00 |
| 19 | 21.17 | 38.42 | 32.42 | 2.50 | 0.50 | 5.00 |

CHART B

*Fig-2*

| SAMPLE | CONSTITUENTS | | | | | COLOR COORDINATES | | | | | | | | | DURABILITY CHARACTERISTICS | | |
|---|---|---|---|---|---|---|---|---|---|---|---|---|---|---|---|---|---|
| | | | | | | 75° | | | 45° | | | 25° | | | ADHESION | GLOSS | FADE | DOI |
| # | $C_1$ | $C_2$ | $C_3$ | ... | $C_n$ | $L^*$ | $a^*$ | $b^*$ | $L^*$ | $a^*$ | $b^*$ | $L^*$ | $a^*$ | $b^*$ | | | |
| $S_1$ | | | | | | | | | | | | | | | | | |
| $S_2$ | | | | | | | | | | | | | | | | | |
| $S_3$ | | | | | | | | | | | | | | | | | |
| $S_4$ | | | | | | | | | | | | | | | | | |
| ... | | | | | | | | | | | | | | | | | |
| $S_X$ | | | | | | | | | | | | | | | | | |

*Fig-5*

| | A | B | C | D | E | F | G | H | I | J | K | L |
|---|---|---|---|---|---|---|---|---|---|---|---|---|
| 1 | | | | | | | | | | | | |
| 2 | | | | PIG 1 | PIG 2 | PIG 3 | PIG 4 | PIG 5 | | | | |
| 3 | | | FORMULATION DATA | C1$_{25}$ | C2$_{25}$ | C3$_{25}$ | C4$_{25}$ | C5$_{25}$ | | | | |
| 4 | | | FORMULATION DATA | C1$_{45}$ | C2$_{45}$ | C3$_{45}$ | C4$_{45}$ | C5$_{45}$ | | | | |
| 5 | | | FORMULATION DATA | C1$_{75}$ | C2$_{75}$ | C3$_{75}$ | C4$_{75}$ | C5$_{75}$ | | | | |
| 6 | | | | | | | | | | | | |
| 7 | | | UPPER PI:P CONSTRAINT | $(p_1:P)_u$ | $(p_2:P)_u$ | $(p_3:P)_u$ | $(p_4:P)_u$ | $(p_5:P)_u$ | | L*a*b* CONSTRAINTS | C/S MODEL EQUATIONS | |
| 8 | | | LOWER PI:P CONSTRAINT | $(p_1:P)_l$ | $(p_2:P)_l$ | $(p_3:P)_l$ | $(p_4:P)_l$ | $(p_5:P)_l$ | | | | |
| 9 | | | K | k1 | k2 | k3 | k4 | k5 | | | | |
| 10 | 25 | L* | K L25 | k1 L25 | k2 L25 | k3 L25 | k4 L25 | k5 L25 | | DESIRED a*$_{25}$ | L*$_{25}$ | <= SOLVER TARGET |
| 11 | | a* | K a25 | k1 a25 | k2 a25 | k3 a25 | k4 a25 | k5 a25 | | DESIRED b*$_{25}$ | a*$_{25}$ | |
| 12 | | b* | K b75 | k1 b25 | k2 b25 | k3 b25 | k4 b25 | k5 b25 | | DESIRED L*$_{25}$ | b*$_{25}$ | |
| 13 | 45 | L* | K L45 | k1 L45 | k2 L45 | k3 L45 | k4 L45 | k5 L45 | | DESIRED a*$_{25}$ | L*$_{25}$ | |
| 14 | | a* | K a45 | k1 a45 | k2 a45 | k3 a45 | k4 a45 | k5 a45 | | DESIRED b*$_{25}$ | a*$_{25}$ | |
| 15 | | b* | K b75 | k1 b45 | k2 b45 | k3 b45 | k4 b45 | k5 b45 | | DESIRED L*$_{25}$ | b*$_{25}$ | |
| 16 | 75 | L* | K L75 | k1 L75 | k2 L75 | k3 L75 | k4 L75 | k5 L75 | | DESIRED a*$_{25}$ | L*$_{25}$ | |
| 17 | | a* | K a75 | k1 a75 | k2 a75 | k3 a75 | k4 a75 | k5 a75 | | DESIRED b*$_{25}$ | a*$_{25}$ | |
| 18 | | b* | K b75 | k1 b75 | k2 b75 | k3 b75 | k4 b75 | k5 b75 | | DESIRED b*$_{25}$ | b*$_{25}$ | |

Fig-7

METHOD FOR FORMULATING PAINT

TECHNICAL FIELD

The present invention relates to a method for formulating paints for automotive vehicles.

BACKGROUND OF THE INVENTION

In the automotive industry, it is desirable to formulate paints that are durable enough to withstand a variety of conditions such as rain, salt, snow and air born projectiles that may contact the vehicles. It is also desirable to provide paints in colors that consumers want or desire. As consumer demand for different colored vehicles varies, different color paints must be newly formulated and tested for durability. However, durability testing can take extensive amounts of time, thereby causing the availability of colors to be substantially delayed such that consumer tastes and desires can go unfulfilled or can change before a desired color is tested and approved. Thus, it is desirable to provide paints of desired colors in short periods of time while still providing assurance that the paints are durable.

SUMMARY OF THE INVENTION

Accordingly, there is provided a method for determining a paint formulation for producing a paint wherein the paint is characterized by desired color coordinates in a three-dimensional color space and desired durability characteristics from a set of known constituents. According to the method, a plurality of color coordinates is provided wherein each of the color coordinates corresponds to paint formulations having respective diverse apportionments of the known constituents. Durability data is provided that is related to durability characteristics exhibited by the paint formulations having the respective diverse apportionments of the known constituents. Thereafter, regression of the color coordinates and the diverse apportionments of the known constituents is performed to establish a set of interdependent equations having first variables corresponding to the known constituents and second variables corresponding to the color coordinates. Then coordinates of a desired color are provided such that the set of interdependent equations may be solved for values of the first variables which substantially equate the second variables to color coordinates substantially near to the desired color and wherein the values of the first variable are constrained by the durability data related to the durability characteristics exhibited by the paint formulations.

These and other aspects of the present invention will become apparent upon reading the following detailed description in combination with the accompanying drawings.

BRIEF DESCRIPTION OF THE DRAWINGS

FIG. 1 illustrates a standard CIEL*a*b three-dimensional color space.

FIG. 2 includes Chart A and Chart B which are examples of charts depicting constituents and constituent ratios that may be used in a design of experiment (DOE).

FIG. 3 illustrates a flowchart of a method for establishing a computational model for formulating paints.

FIG. 5 illustrates an example of a chart for monitoring data of a design of experiment (DOE).

FIG. 7 illustrates an exemplary spreadsheet for executing a computational model for formulating paints.

DESCRIPTION OF THE PREFERRED EMBODIMENT

The present invention provides a method for formulating a paint wherein a desired color for the paint is chosen and a formulation that will at least approximately produce a paint of the color chosen is provided by a computational model. Preferably, the computational model includes data related to color and durability characteristics of constituents used for the formulation.

In U.S. Pat. No. 5,907,495, which is herein fully incorporated by reference, a method for formulating paint using color space modeling was disclosed. The method of the present invention provides additional tools for formulating paint using such color space modeling.

Referring to FIG. 1, there is illustrated a three-dimensional representation of color space. The color space representation is the familiar CIE L*a*b* uniform Cartesian-coordinate color space standard promulgated by the Commission Internationale de l'Enclairage (International Commission on Illumination) and based upon well known cube root functions of tristimulus values (X, Y, Z) of colors derived from the response of the average human or the so called "standard observer." The L*a*b* color space is generally well accepted and is generally used in self-referenced tolerancing of colors. The present invention makes use of the L*a*b* color space standards and representations in carrying out the functions to be described though other color space standards and representations may be utilized. For example, at least one other color space coordinate systems (L*C*H*) based upon the L*a*b* color space is well known and provides an alternative standard used in self-referenced color tolerancing applications. The L*C*H* color space is represented by polar coordinates in the L* plane which are derived from the Cartesian coordinates along the a* and b* axes in the L*a*b* color space.

Regardless of the color space coordinate system utilized, it is generally well accepted that the three-dimensional color space can be used to define colors in terms of certain color characteristics or color attributes. The axis labeled L* in the figure represents a scale of luminous intensity or degree of lightness attribute. The axis labeled a* represents a scale of red/green appearance and the orthogonal axis b* represents a scale of yellow/blue appearance. The information contained in the combination of a color's a*-b* axes position represents the chromatic attributes known as hue and saturation. The hue varies with the position about the L* axis. Therefore, a complete set or group of color attributes, or the attributes' defining coordinates comprising lightness (L*), red/green (a*), and yellow/blue (b*) in the L*a*b* color space, fully defines a color point or locus in the color space. When generally used herein, the term color shall be understood to be fully defined by one or more complete sets or groups of color attributes or corresponding coordinates considering all three dimensions or axes in a three dimensional color space.

Figure 6:
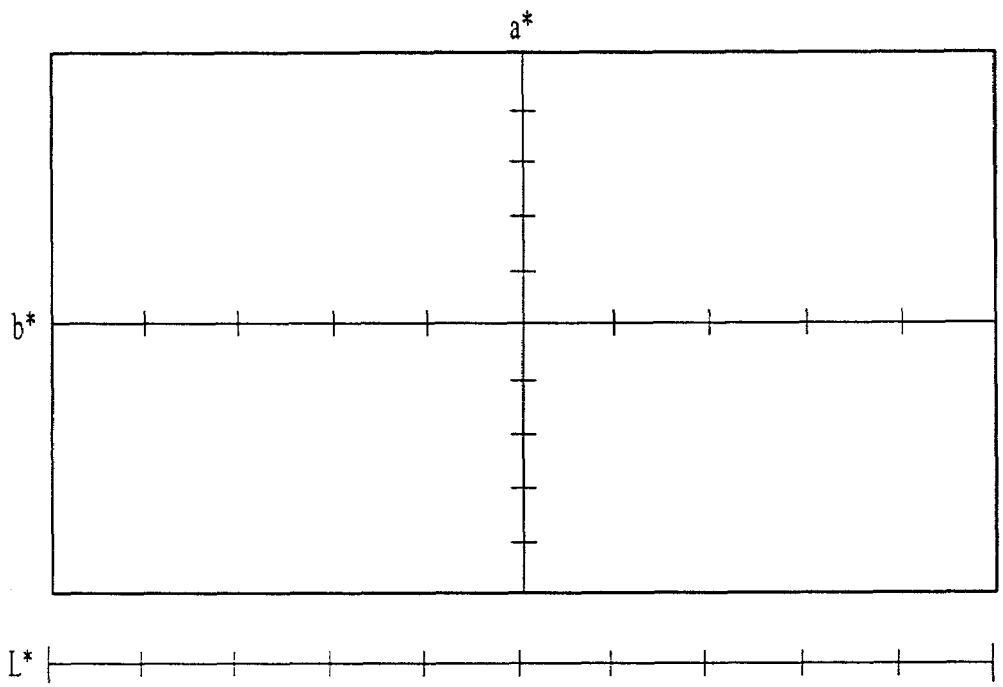
FIG. 6 illustrates an alternative manner of illustrating the CIEL*a*b* color space.

Referring to FIG. 6, color space may be modeled in a two dimensional plot by placing the lightness/darkness scale next to a two-dimensional color scale having the a*b* coordinates and thereafter using two points to represent one color, one point on the lightness/darkness scale and one point on the color scale.

Generally, paints are formed by combining constituents such as pigments and optionally metal particles with resin binders and the colors of the paints are identified by coordinates in color space. By altering amounts or proportions of constituents, especially pigments, of paint formulations, the color of the paint and, therefore, the coordinates of the paint color in color space may be altered.

Constituents are chosen to form particular paints based upon chemical compatibility. Experience in the paint industry has taught that mixing pigments together with compatible chemical characteristics fortifies the durability of paints while mixing pigments with incompatible characteristics weakens paints. Thus, to assist in formulating durable paints, pigments that exhibit similar chemical characteristics are grouped into a chemistry family so that pigments from compatible families can be combined while avoiding incompatible combinations. Chemistry families frequently used in the automotive industry include perylenes, pthalos, quinacridones, oxides and many others.

Figure 9:
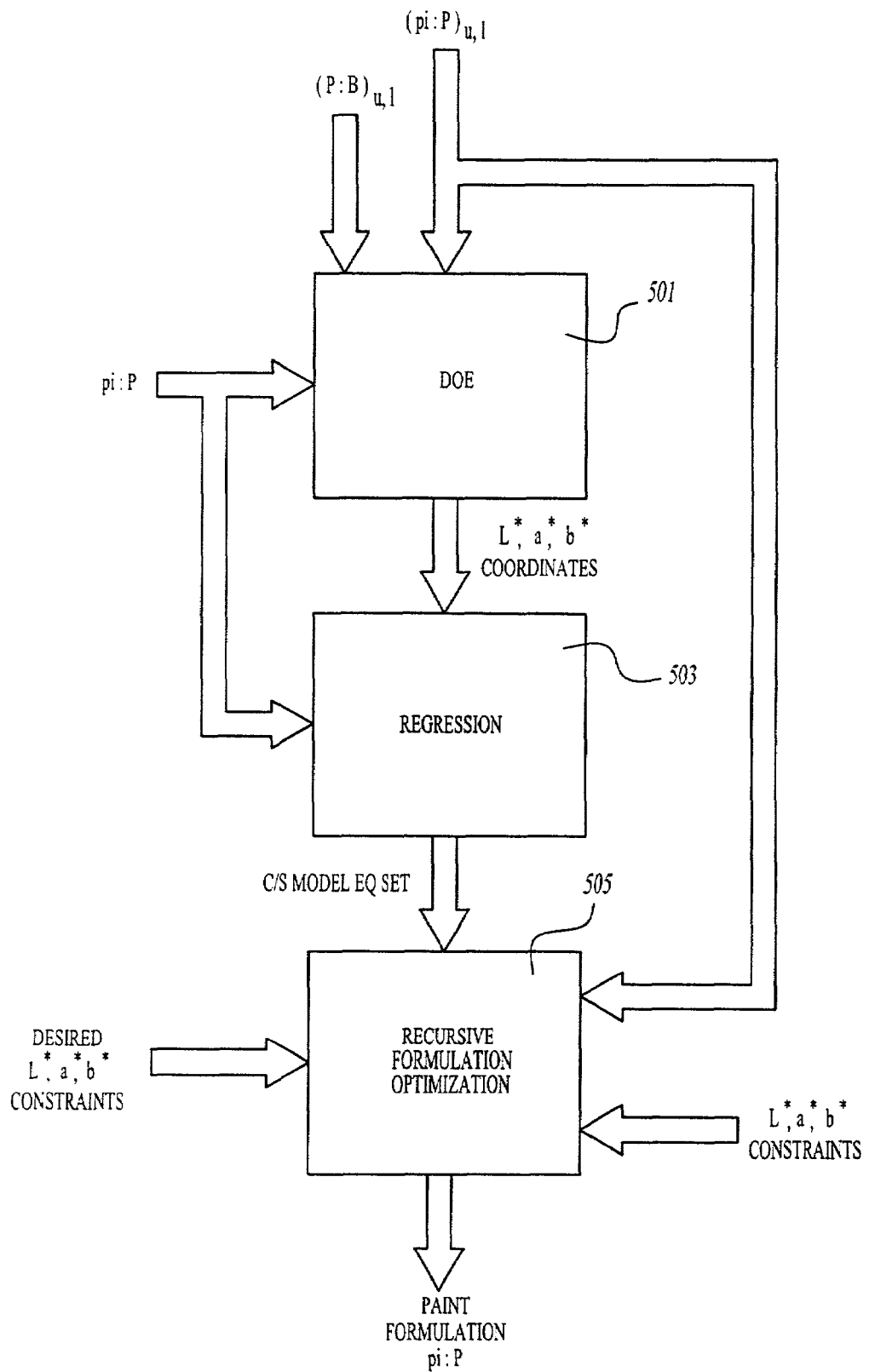
FIG. 9 illustrates a flowchart of the method of formulating paints.

According to the invention, one or more designs of experiment DOEs are initiated as indicated at block 501 of FIG. 9. A DOE involves choosing a set of constituents from compatible chemistry families to be combined in various ratios according to several paint formulations to assist in defining a color region (i.e., a generally continuous region within color space containing colors for paints that can be formed by the constituents chosen for a DOE). As an example, various amounts of pigments from chemistry families such as perylenes, quinacridones, russet micas, black and trans red oxides can be combined to form paints within a blue shade red color region 40 located in the forward right quadrant of the color space model of FIG. 1. Optionally, metal particles such as aluminum that typically minimally effect pigment chemistry may be added to a paint group to make the group metallic.

The formulations for each DOE are chosen as indicated at block 100 of FIG. 3 to exhibit colors with color space coordinates dispersed over substantially an entire color region and to exhibit various levels of durability.

Preferably, paint formulations are formed for at least two levels related to durability, a first level at which paints are expected to be durable (i.e., maintain acceptable levels of durability characteristics such as fade, distinctness of image (DOI), adhesion, gloss or others) for a time greater than a predetermined period of time established for the DOE and a second level at which paints are expected to be failing or near failing in durability (i.e., failing to maintain acceptable levels of the aforementioned durability characteristics). The predetermined period of time and acceptable levels of durability characteristics are chosen by the designer of the DOE and may take into account industry standards, conditions under which the paints will be used and the like. Therefore, for automotive vehicles, second level paint formulations may be chosen that are expected to be close to failing after, as an example, ten years under normal conditions or less time at extreme conditions.

To generally determine what ratios of pigments will form more and less durable paints, resort may be made to information such as historical data, pigment supplier information, experimentation and the like. Using such information, assumptions regarding the effects of raising or lowering the ratios of constituents used to make paints within a color region can be made based upon known interactions of constituents. In charts A and B of FIG. 2, exemplary DOE formulations are illustrated for blue shade red metallic paints in the color region 40 of FIG. 1. The following exemplary assumptions were made to assist in determining the exemplary formulations of that Figure: 1) Perylene is the backbone of red pigmentation, 2) quinacridone magenta is the weakest within the chemistry family for durability performance, 3) aluminum is generally durable and may be substituted in a variety of amounts without affecting durability 4) titanium dioxides, carbon blacks and trans oxides are durable pigments that fortify the durability of other pigments.

Based upon the assumptions for the example formulations in FIG. 2, red iron oxide, carbon black and aluminum are held constant because variations of these constituents are not believed to greatly affect the durability of the paint formulations of this particular DOE. On the other hand, different amounts of perylene, blue russet mica and quinacridone are expected to have effects on color and durability. Therefore, such constituents are varied for the DOE, and particularly low levels of quinacridone magenta are tested to form paints which are failing or near failing since it is known that low levels of quinacridone magenta can produce less durable paints. It shall be recognized that constituents from chemistry families can be made for nearly any region in color space and assumptions for such family may be made to form proper DOEs.

Once constituents for formulations are chosen, the constituents are combined or mixed as indicated at block 110 of FIG. 3 to form paints. The constituent amounts may be recorded in a variety of manners including manual or computers methods. Computer programs such as Microsoft EXCEL are appropriate for recording amounts of constituents. An exemplary recording spreadsheet is shown in FIG. 5.

Ratios are kept using notations such as the pigment to binder ratio (P:B) and the pigment ratio ($p_i$:P). As used herein P is the total amount of pigment in a paint, B is the total amount of binder in the paint and $p_i$ represents the amount of the $i^{th}$ individual pigment constituent from a set of n known pigments in the paint formulation. Thus, the total amount of pigments P can be expressed as:

$$P = \sum_{i}^{n} p_i$$

Therefore, P:B represents the ratio of the summation of the quantities of all individual pigments to the quantity of the binder, whereas $p_i$:P represent the ratio of the quantity of the individual pigments to the summation of the quantities of all the individual pigments. Amounts and ratios may be figured using weight, mass, volume or other measure, however the preferred convention is weight.

Referring to run 3 of chart B in FIG. 2, the pigment perylene is 5 percent by weight of all pigments such that $p_i$ for perylene equals 0.05*P and similar calculations are carried out for the remainder of the pigments. In chart B, various paints are formulated according to the weight formulations in the rows of the chart.

Once the test paints are formulated, the paints are applied to substrates as indicated at block 120 of FIG. 3 and the test paints are tested as indicated at block 130. Preferably, the paints are applied to metal panels and placed in an extreme environment which is particularly taxing upon the durability of the paints. Such environments include, for example, conditions such as heat, cold, ultra-violet exposure and salt.

The paint panels are exposed to the environment for a predetermined time period (e.g. six months, two years or more). Periodically during such exposure, the paints on the panels are tested for the various properties related to durability such as adhesion, gloss, DOI, fade and the like. Several tests for these durability characteristics are known and may be used according to the present invention. Exemplary tests and instruments include tensile adhesion tests, gloss meters, distinctness of image meters and the like.

As indicated at block 140 in FIG. 3, one or more of these durability characteristics are recorded for each paint made from its respective formulation in a database such as that shown in FIG. 5. Thus, the paint formulations are correlated to the respective durability characteristics that the formulations exhibit.

Additionally, color measurements of the paints on the panels are performed during testing to correlate the colors of the paints to coordinates in color space and the color coordinates are also recorded in the database as indicated at block 140. The color measurements may be performed with a spectrophotometer adapted to perform single or multi-angular measurements and store and transfer L*a*b* color coordinates corresponding to the color attributes of the painted panels. The data may be stored in a general purpose personal computer or other memory unit for use in developing the color space model. A preferred and generally accepted standard single angle for measurement is substantially a 45 degree flash or specular angle. A spectrophotometer meeting the preferred capabilities of multi-angular measurements and data storage and transfer is the MA68 Multi-Angle Spectrophotometer available from X-Rites® Corporation having bi-directional data interface by way of a standard RS-232 port.

In the example, the blue shade red metallic paints may be plotted in the region 40 of the color space model of FIG. 1 by the red, blue and darkness coordinates. For each paint on each panel, the constituents of the paint's formulation, the color coordinates of the paint, and the durability properties of the paint are recorded in a matrix such as the matrix in FIG. 5.

Once the tests have been completed and data recorded, a color space model is computationally established, as indicated at block 150 of FIG. 3, based upon the properties and resultant colors of the paints formulated in the DOE. The model relates the known constituents, the resultant color coordinates and the durability characteristics to each other from the number of test panels for building a model for retrieving constituent outputs for a predetermined set of color coordinate inputs and the durability characteristics can be used for constraining the model. A variety of general techniques may be used in so establishing the color space model. For example, a preferred technique employs conventional multi-variable linear regression to construct a first-order linear model comprising a plurality of coupled equations. Alternate techniques include standard training of a neural network with input vectors corresponding to the color coordinates of the test panels, output vectors comprising the full set of constituents and target vectors corresponding to the respective test panel constituents. However, neural network derived models generally make use of numerous sets—far in excess of the number of samples associated with a two-level DOE—of input vectors in the training phase which may be overly burdensome in light of the necessity of providing correspondingly numerous sets of physical samples and measured color coordinate data.

In the preferred approach, linear regression analysis is performed using the multi-angle L*a*b* measurements and the pigment apportionments to derive regression constants (K) and factor coefficients ($k_i$), where i designates the associated factor (pigment). In the present example, the color coordinates L*a*b* are designated as the regression dependent variables, and the constituents (pigments) $C_1$–$C_n$ are designated as the regression independent variables or factors. The regression apportions shares in each of the L*a*b* coordinates to each of the n factors (constituents) $C_1$–$C_n$ based on the x paint samples $S_1$–$S_x$ thereby providing a respective set of factor (pigment) coefficients and constant for each L*a*b* coordinate. An exemplary set of first-order regression equations expressed for the example of a 45 degree angular analysis for the L*a*b* coordinates appear below in general form:

$$L^*_{45} = k1_{L45}*C_1 + k2_{L45}*C_2 + k3_{L45}*C_3 + k4_{L45}*C_4 + k5_{L45}*C_5 + K_{L45} \quad (3)$$

$$a^*_{45} = k1_{a45}*C_1 + k2_{a45}*C_2 + k3_{a45}*C_3 + k4_{a45}*C_4 + k5_{a45}*C_5 + K_{a45} \quad (4)$$

$$b^*_{45} = k1_{b45}*C_1 + k2_{b45}*C_2 + k3_{b45}*C_3 + k4_{b45}*C_4 + k5_{b45}*C_5 + K_{b45} \quad (5)$$

wherein the subscripts designate the L*a*b* coordinate and angle set for the coefficients ki and constants K. In total, for a complete three-angle L*a*b* first-order regression analysis, a set of nine first-order regression equations result in respective sets of n factor coefficients and a respective constant. A single-angle analysis would yield three first-order regression equations. The number of first-order regression equations will be equivalent to three times the number of angles in the analysis. The regression functions may be performed by any of a variety of well known commercially available software packages including, for example, general purpose spreadsheet applications such as Microsoft Excel, available from Microsoft Corporation.

The preceding regression steps are represented by block 503 of FIG. 9 wherein the color coordinates from the DOE and the samples'$p_i$:P are the regression inputs. The regression outputs are the color space model equation set including the constant and the coefficients for each equation. The color space model equation set will then represent a three-dimensional color region for which color is generally known. It should be recognized that with appropriate choices of constituents for one or more DOEs, nearly all of color space can be represented with color regions.

With the color space model having been developed as a plurality of first-order color space equations relating the various selected pigments to respective L*a*b* color coordinates, the next general objective presented is to provide therefrom at least nearly pigment apportionments which will result in a selected L*a*b* color coordinate with desired durability characteristics.

Figure 4:
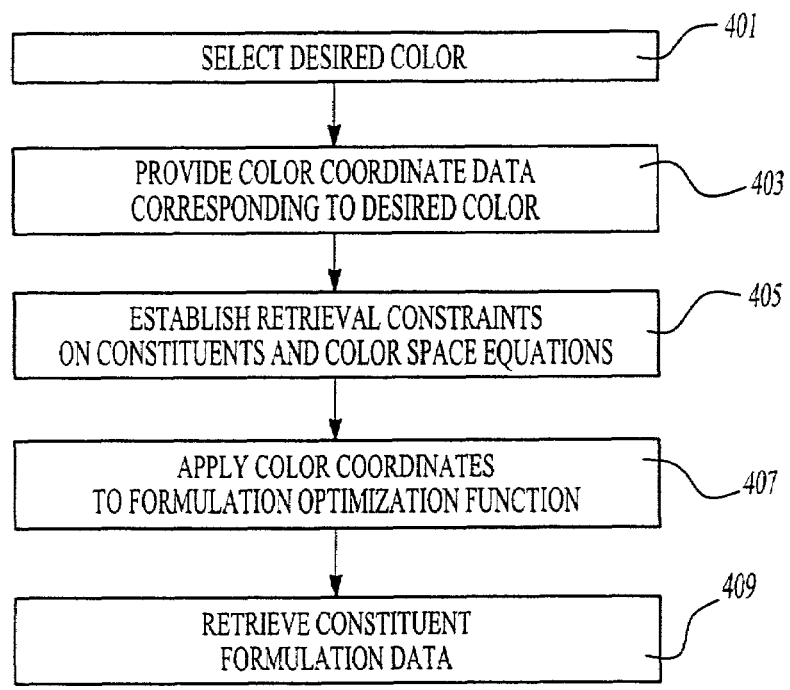
FIG. 4 illustrates a flowchart of a method for formulating paint using the computational model.

With reference to the flow chart of FIG. 4, to retrieve pigment apportionment formulation, data block 401 of the flow chart requires selection or determination of a desired color or color range and block 403 requires that the color be represented or expressed as a L*a*b* color coordinate. The desired color is to be provided in consistent color coordinate format (L*a*b* in the present example) as used in the model development, color space visualization graphical tools, and color measurement instrumentation previously described.

One preferred manner of selecting a desired color is to refer to a color space visualization graphical tool such as that described with respect to FIG. 6. In such a manner, a color may be selected from a color region within color space for which a DOE has been performed and for which durability characteristics have been recorded. Ideally, a color of interest may be chosen or identified and coordinates of that color may be identified or determined using previously discussed instrumentation.

Alternative color selections may be made by examination of the physical painted panels which were produced for the DOE in development of the color space model. The panels may be used directly by referencing the corresponding L*a*b* color coordinate data which was measured in the steps of the DOE or by using the corresponding L*a*b* color coordinate data from two or more of the panels and formally or informally interpolating a desired paint color therebetween. Furthermore, a spectrophotometer may be used to measure a surface having a color of interest such as a panel from another vehicle, and the corresponding L*a*b* color coordinates compared graphically to historical and/or current colors or color space capabilities corresponding to known paint formulations which may indicate the feasibility of formulating a paint to match the measured color from one or more of the known paint formulations.

Selection of the desired color and provision of the corresponding L*a*b* coordinates having been accomplished, block 405 represents the establishment of constraints upon the constituents and color space equations for the retrieval of formulation data from the color space model. Preferably, the constituent constraints are consistent with the DOE factor levels. Also, the color coordinates are preferably treated as constants in the retrieval of constituent apportionments from the model. Consequently, block 407 represents the application of the color attributes to the color space model and recursively modifying the constituent apportionments to provide an optimum solution to the coupled equations of the color space model while working within the constraints of the retrieval on the constituents, durability and color space equations. The variables in such an optimization are therefore limited to the constituents, and the constants comprise the coefficients (k) and the constants (K). Rational solutions to the color space equations using the constraints consistent with the equations' development indicates that the color coordinates are within the color space capability of the constituents and constraining the equations by desired durability characteristics assure that formulations provided by the equations will form reasonably durable paints.

A preferred optimization is provided by any of a variety of well known commercially available software packages including, for example, general purpose spreadsheet applications such as Microsoft Excel, available from Microsoft Corporation. Microsoft Excel provides a Solver function which allows a multiplicity of coupled equations to be considered in providing optimal solutions within certain predefined iterative and time execution limits and within certain variable and equation output manipulation limits. FIG. 7 illustrates an exemplary Excel worksheet used in optimizing a solution to a three-angle color space model characterized by nine color space model equations and five known constituents. The general forms of the color space model equations are contained as formulas in the cell range K10:K18 which reference other worksheet cells containing respective constants and coefficients as further described below. The desired formulation outputs include pigment ratios required for each pigment for three measurement angles shown in cell range D2:H4, the values of which are the recursive variables iteratively changed in the optimization. The constraints placed upon the Solver are of two categories: pigment ratio constraints related to color and durability exhibited by formulations of the DOE, arguments for which are located in cell range D6:H7; and color space equation constraints, arguments for which are located in cell range J11:J18. The constants and coefficients of the color space model equations are located in cell ranges C10:C18 and D10:H18, respectively. The pigment ratio constraint arguments related to color preferably correspond to the pigment ratio constraints used in the regression analysis to derive the color space model equations where the paint formulations of the DOE formed within those constraints exhibited durability characteristic above failing. However, where the pigment ratio constraints used to derive the color space model equations are formulations that form paints with failing durability characteristics, the constraint arguments in cell range D6:H7 are preferably established so that the pigment ratio constraint arguments do not allow the optimization of output paint formulations that produce failing paints. In other words, paint formulations of both failing and/or non-failing paints of the DOE must be analyzed to establish pigment ratio constraints that assure proper durability characteristics of paint formulations or pigment ratios that will be output by the optimization. Preferably, the constants and coefficients are provided by the regression analysis and are not varied by the Solver function though they are referenced by cell addresses in the formulas for color space equations contained in cell range K10:K18, an example of which is set forth below for cell K10 containing the formula for the $L^*_{25}$ coordinate color space equation:

$$i=C10+(D2*D10)+(E2*E10)+(F2*F10)+(G2*G10)+(H2*H10) \quad (6)$$

The color space equation constraint arguments, cell range J11:J18, correspond to the respective desired color space coordinates supplied and are not varied by the Solver function.

In the present example, the Solver is invoked to find an optimal solution to the color space equations which minimize the deviation of the value of the $L^*_{25}$ color space model equation contained in cell K10. The values of the remaining color space model equations contained in cell range K11:K18 are constrained to the constraint arguments (desired L*a*b* values) entered into cell range J11:J18. Similarly, the values of the recursive variables (i.e. pigment ratios) contained in cell range D2:H4, are constrained to the constraint arguments (upper and lower ratio limits) entered into cell range D6:H7.

Figure 8:
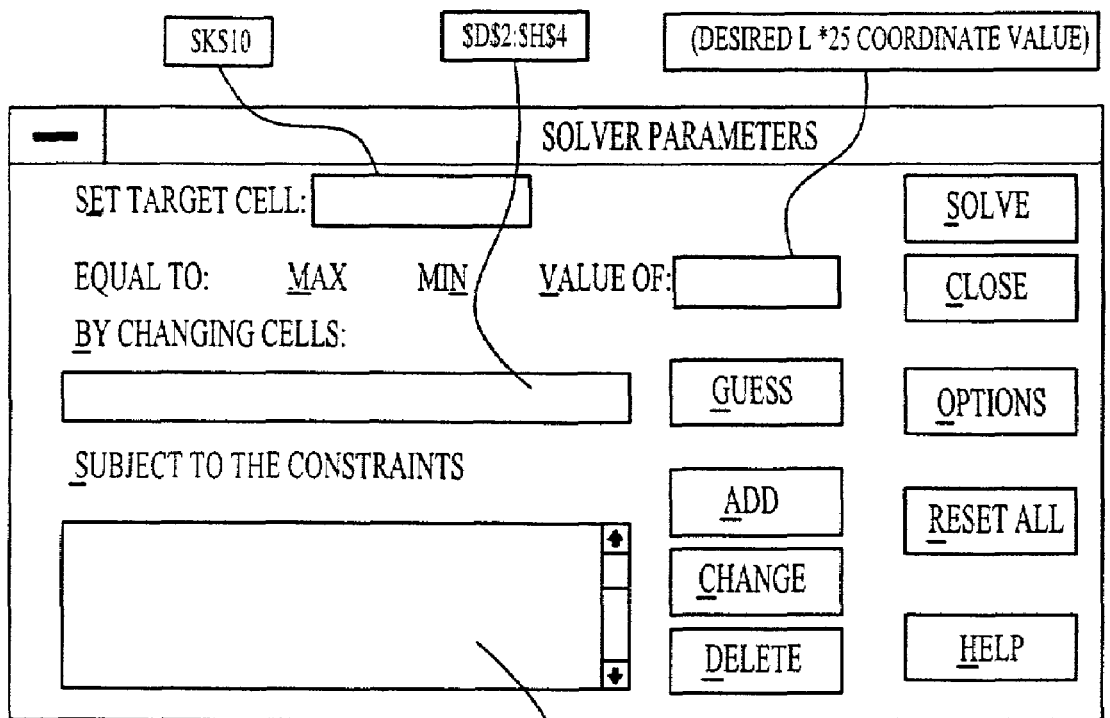
FIG. 8 illustrates an exemplary solver for executing the computational model for formulating paints.

Implementation of the recursive optimization as described is set up and invoked by entering the respective constraint arguments (i.e. pigment constraints values and desired L*a*b* color coordinates) into the appropriate cells, entering the respective constants and coefficients of the color space model equations into the appropriate cells, and entering the general cell referenced formulas—such as formula (6) above—corresponding to respective color space model equations into the appropriate cells. Solver parameters are next entered by selecting Solver from the Tools drop down menu. Entries are then made into the input areas of the dialogue window which appears substantially as shown in FIG. 8. The target cell in the present example is entered as K10, the target value is entered as the desired $L^*_{25}$ color coordinate value, the changing cells are entered as cell range D2:H4, and the constraints are entered as logical statements limiting the pigment cell values to between the respective pigment constraint values and the color space model equation values, not including the target cell value, to the respective desired L*a*b* values as shown. Default values are used for Solver options but may be altered to suit the particular application.

After Solver has completed the optimization, the solution pigment ratios are output to cell range D2:H4, which corresponds to block 409 of FIG. 4. The solution will be indicated as feasible or not feasible. Feasible solutions verify that the desired color coordinates are within the capability of the constituents and that the durability of the output formulation is above failure level as set up for the color region. Where the solution is indicated as not feasible, the desired color coordinates are not within the capability of or are below the failure durability level of the constituents.

The preceding retrieval steps are represented by block 505 of FIG. 9 wherein the color space model equations, desired color coordinates, and $p_i$:P constraints are the inputs to the recursive formulation optimization. The output is the paint formulation including an indication of feasibility in light of the constraints on color and durability. The output formulation may not be the exact color desired, but will give a reasonable certainty of whether the desired color can be formulated with a reasonable assurance of durability. Thereafter, other paint formulations may need to be resorted to or other DOEs (e.g., DOE's disclosed in U.S. Pat. No. 5,907,495) to achieve the formulation for the exact color. However, because the formulation given by the solver is assured of durability, so too, are formulations very similar to the formulation from the solver, and the actual formulation for a desired color will be very close to the formulation from the solver depending upon the number of samples used to form the computational model.

By forming a model of paint formulations within a color region having acceptable durability characteristics, the amount of color space and therefore the amount of colors for which paints can be formulated is expanded while maintaining a reasonable degree of certainty that such paints will be durable.

It should be understood that the invention is not limited to the exact embodiment or construction which has been illustrated and described but that various changes may be made without departing from the spirit and the scope of the invention.

The invention claimed is:

1. A computer implemented method for determining a paint formulation for producing a paint characterized by desired color coordinates in a three-dimensional color space and desired durability characteristics from a set of known constituents, said method comprising:

providing a plurality of color coordinates, each of the color coordinates corresponding to paint formulations having respective diverse apportionments of the known constituents;

providing durability data related to durability characteristics exhibited by the paint formulations having the respective diverse apportionments of the known constituents;

performing regression analysis of the color coordinates and the diverse apportionments of the known constituents to establish a set of equations relating first variables corresponding to the known constituents and second variables corresponding to the color coordinates;

providing desired coordinates and constraints of a desired color; and recursively solving said set of equations for values of the first variables that will obtain values for the second variables substantially near to the desired coordinates wherein the values of the first variable are constrained by the durability data related to the durability characteristics exhibited by the paint formulations.

2. A method as in claim 1, wherein the one of the durability characteristics is selected from a group consisting of gloss, adhesion, distinctness of image and fade.

3. A method as in claim 1, wherein the paint formulations are predetermined such that at least one of the paint formulations exhibits at least one durability characteristic near failing wherein failing is defined by a predetermined length of time for which the at least one paint formulation should exhibit an acceptable level of the at least one durability characteristic according to industry standards.

4. A computer implemented method of determining a paint formulation for producing a paint characterized by desired color coordinates in a three-dimensional color space from a set of known constituents, the method comprising; providing a plurality of paint samples, each paint sample characterized by respective diverse constituent apportionment data; providing respective color coordinate data defining, for each paint sample, color position in a three dimensional color space; providing durability data related to the durability characteristics exhibited by each of the paint samples; relating the constituent apportionment data to the color coordinate data to derive a formulation model characterized by correlation of the known constituents to color attributes defining color positions in the three dimensional color space, each color position further defined by the durability characteristics exhibited by its respective paint sample; applying the color coordinate data and the durability data to a select paint color in the three dimensional color space to determine constituent apportionments corresponding to the select paint color.

5. A method as in claim 4, wherein the one of the durability characteristics is selected from a group consisting of gloss, adhesion, distinctness of image and fade.

6. A method as in claim 4, wherein the apportionment data is predetermined to assist in defining the durability data such that at least one of the samples is near failing in durability as defined by the formulation model.

* * * * *